US012782874B2

(12) United States Patent
Hayashi et al.

(10) Patent No.: US 12,782,874 B2
(45) Date of Patent: Nov. 3, 2026

(54) TIMEPIECE

(71) Applicant: SEIKO EPSON CORPORATION, Tokyo (JP)

(72) Inventors: Koki Hayashi, Shiojiri (JP); Kenichiro Matsumoto, Fujimi (JP); Toru Takiuchi, Matsumoto (JP); Eiichi Hiraya, Shiojiri (JP); Toru Kawasaki, Shiojiri (JP)

(73) Assignee: SEIKO EPSON CORPORATION (JP)

(*) Notice: Subject to any disclaimer, the term of this patent is extended or adjusted under 35 U.S.C. 154(b) by 188 days.

(21) Appl. No.: 18/919,528

(22) Filed: Oct. 18, 2024

(65) Prior Publication Data

US 2025/0130530 A1 Apr. 24, 2025

(30) Foreign Application Priority Data

Oct. 20, 2023 (JP) ................................. 2023-180858

(51) Int. Cl.
*G04B 19/28* (2006.01)

(52) U.S. Cl.
CPC .................................. *G04B 19/283* (2013.01)

(58) Field of Classification Search
CPC ..... G04B 19/28; G04B 19/283; G04B 19/286
See application file for complete search history.

(56) References Cited

U.S. PATENT DOCUMENTS

| | | | | |
|---|---|---|---|---|
| 9,501,037 | B2 * | 11/2016 | Silvant | G04B 19/283 |
| 11,609,538 | B2 * | 3/2023 | Di Piazza | G04B 19/283 |
| 2004/0141424 | A1 | 7/2004 | Hartmann et al. | |
| 2015/0185702 | A1 | 7/2015 | Silvant | |
| 2019/0187619 | A1 * | 6/2019 | Wahler | G04B 37/0041 |
| 2022/0197216 | A1 | 6/2022 | Devillard et al. | |

FOREIGN PATENT DOCUMENTS

| | | | |
|---|---|---|---|
| EP | 1431845 | A1 | 6/2004 |
| EP | 2672333 | A1 | 12/2013 |
| EP | 4020097 | A1 | 6/2022 |
| JP | 2015-108512 | A | 6/2015 |

* cited by examiner

*Primary Examiner* — Edwin A. Leon
*Assistant Examiner* — Jason M Collins
(74) *Attorney, Agent, or Firm* — Harness, Dickey & Pierce, P.L.C.

(57) ABSTRACT

A timepiece includes hands that indicate time; a movement that drives the hands; a case band that stores the movement; a rotating bezel provided to be rotatable with respect to the case band; and a rotating bezel pressing ring fixed to the case band. The rotating bezel pressing ring includes a protruding portion that protrudes outward in a radial direction, and that holds the rotating bezel between the protruding portion and the case band. The protruding portion is provided with an annular restriction portion in which a plurality of restricted portions are continuous with each other in a circumferential direction. The rotating bezel is provided with a restricting member that engages with the restricted portion. When the rotating bezel is rotated, the restricting member sequentially engages with the restricted portions, so that a click feeling is generated in the rotational operation of the rotating bezel, and a position of the rotating bezel is restricted.

7 Claims, 8 Drawing Sheets

TIMEPIECE

The present application is based on, and claims priority from JP Application Serial Number 2023-180858, filed Oct. 20, 2023, the disclosure of which is hereby incorporated by reference herein in its entirety.

BACKGROUND

1. Technical Field

The present disclosure relates to a timepiece including a rotating bezel.

2. Related Art

In the related art, a timepiece including a rotating bezel, such as a diver's watch, has been known. The rotating bezel is a bezel that is rotatably mounted around a cover glass, and a scale or the like corresponding to a hand of the timepiece is indicated on a front surface of the bezel. In such a rotating bezel, the function of easily reading an elapsed time from a certain point of time or the like can be obtained by appropriately rotating the rotating bezel and setting a relationship between the scale and the hand.

As a timepiece with such a rotating bezel, a timepiece in which a click groove is formed on a back surface side of the rotating bezel and a leaf spring member is mounted on a case side of the timepiece has been known (refer to JP-A-2015-108512). In the timepiece, by engaging the leaf spring member with the click groove, a click feeling can be obtained when the rotating bezel is rotated, and reverse rotation of the rotating bezel can be prevented.

However, in the timepiece of JP-A-2015-108512, in order to obtain an appropriate click feeling and a reverse rotation prevention effect, it is necessary to ensure a bending amount of the leaf spring member, and a height from a groove portion of the case side to which the leaf spring member is attached to the click groove of the rotating bezel is defined. For this reason, the thickness dimension of the timepiece cannot be reduced, and the timepiece is difficult to make thinner, which is a problem.

In addition, the click groove has to be formed continuously in a circumferential direction on a back surface of the rotating bezel, and the number of machining steps is increased, and the cost is increased, which is a problem.

SUMMARY

A timepiece according to an aspect of the present disclosure includes hands that indicate time; a movement that drives the hands; a case band that stores the movement; a rotating bezel provided to be rotatable with respect to the case band; and a rotating bezel pressing ring fixed to the case band. The rotating bezel pressing ring includes a protruding portion that protrudes outward in a radial direction, and that holds the rotating bezel between the protruding portion and the case band. The protruding portion is provided with an annular restriction portion in which a plurality of restricted portions are continuous with each other in a circumferential direction. The rotating bezel is provided with a restricting member that engages with the restricted portion. When the rotating bezel is rotated, the restricting member sequentially engages with the restricted portions, so that a click feeling is generated in the rotational operation of the rotating bezel, and a position of the rotating bezel is restricted.

DESCRIPTION OF EMBODIMENTS

First Embodiment

Hereinafter, a timepiece 1 with a rotating bezel according to a first embodiment will be described with reference to the drawings.

Figure 1:
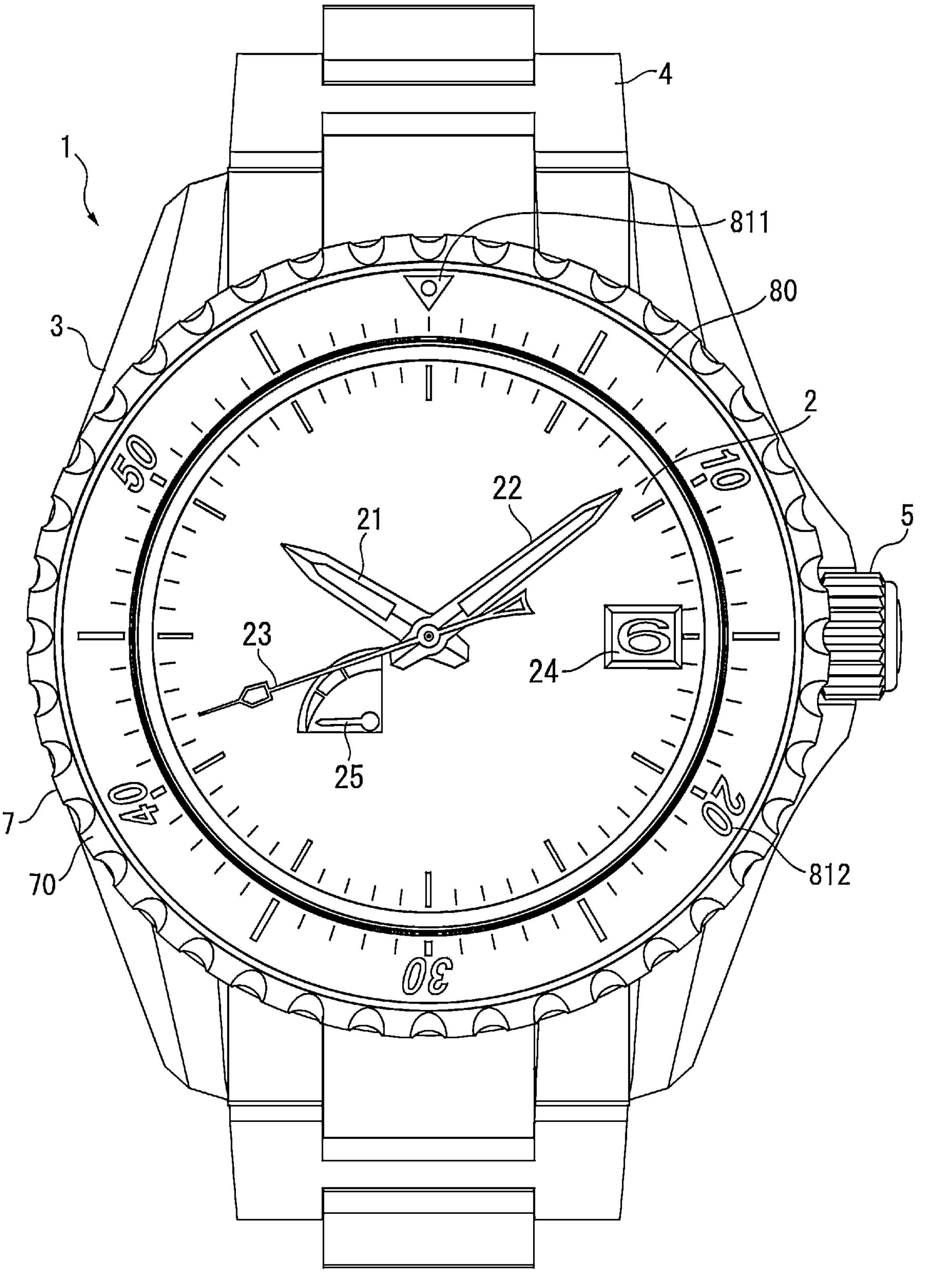
FIG. 1 is a front view showing a timepiece according to a first embodiment.
Figure 2:
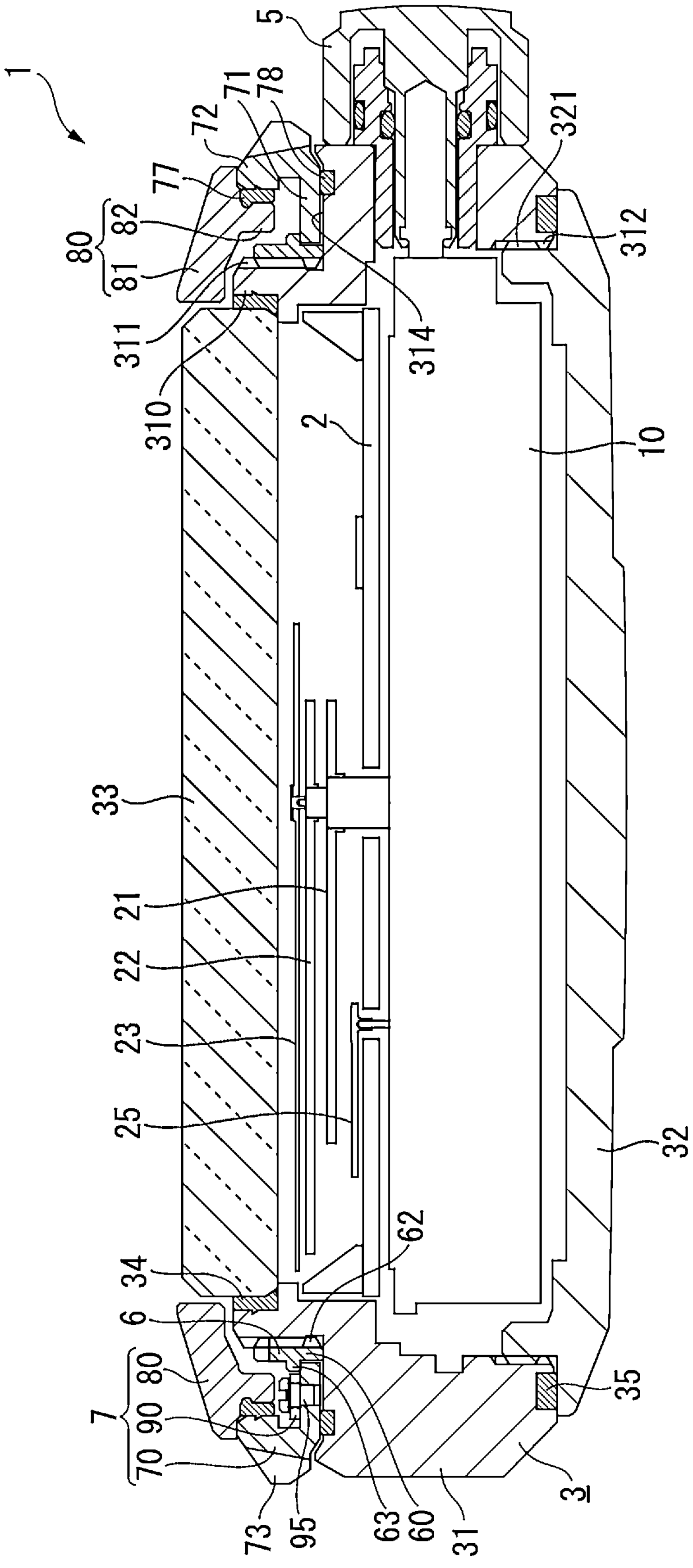
FIG. 2 is a cross-sectional view showing the timepiece according to the first embodiment.
Figure 3:
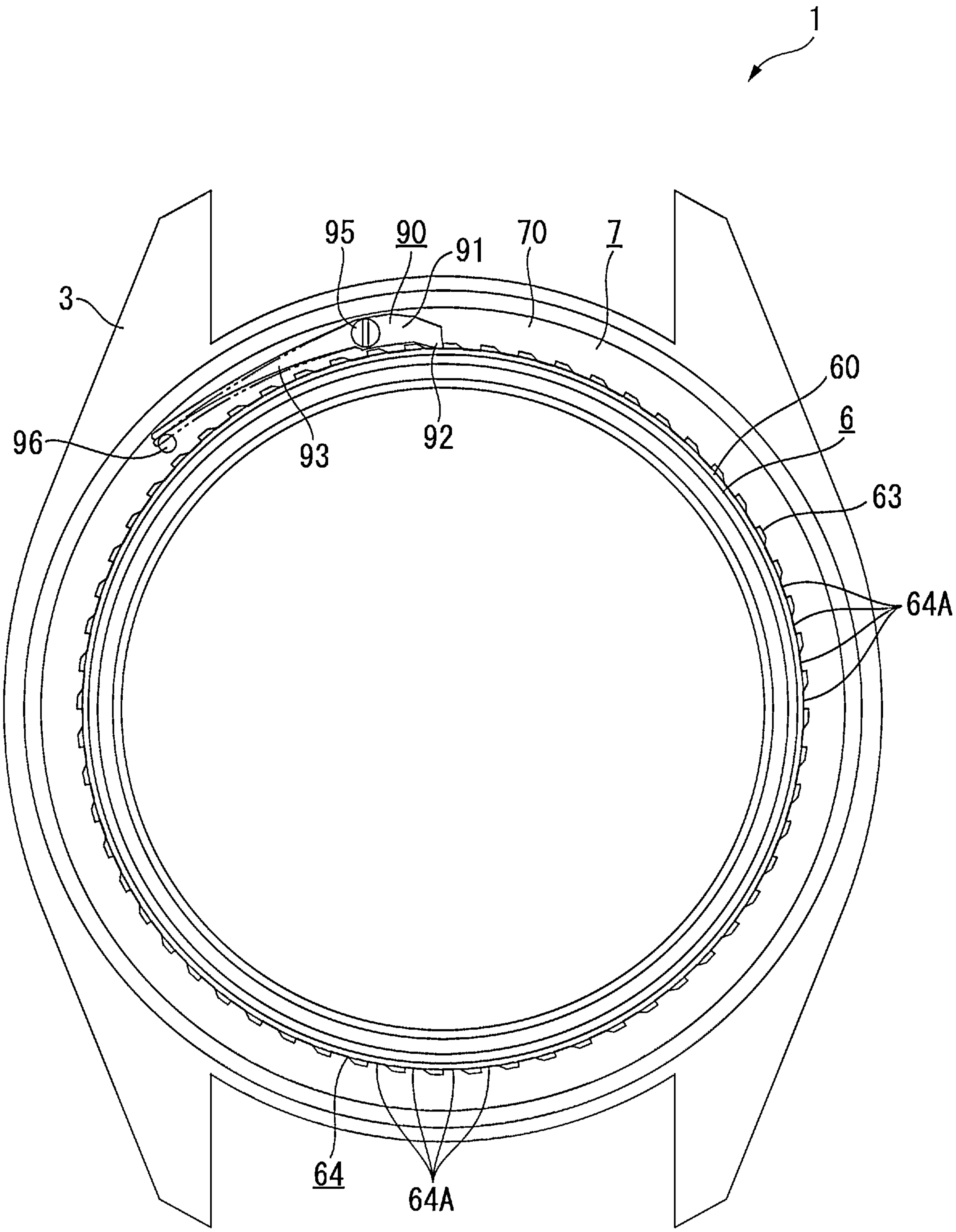
FIG. 3 is a plan view showing main portions of the timepiece according to the first embodiment.
Figure 4:
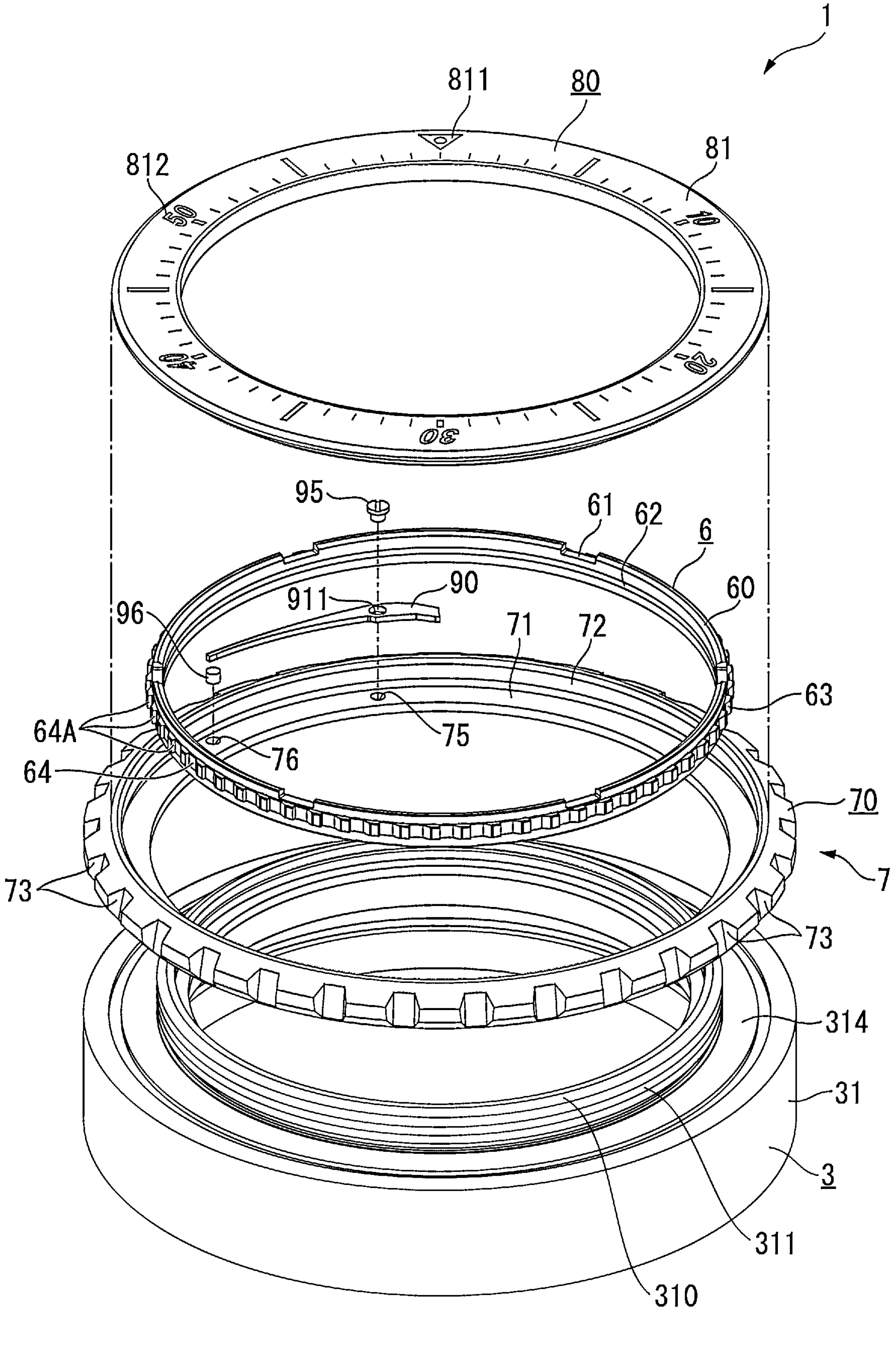
FIG. 4 is an exploded perspective view showing main portions of the timepiece according to the first embodiment.

FIG. 1 is a front view showing a schematic of the timepiece 1 according to the first embodiment. FIG. 2 is a cross-sectional view of the timepiece 1, FIG. 3 is a plan view showing main portions of the timepiece 1, and FIG. 4 is an exploded perspective view showing exterior components of the timepiece 1.

As shown in FIGS. 1 and 2, the timepiece 1 is a diver's watch that a diver who dives into the sea or the like uses during diving. The timepiece 1 includes, as indicator portions for indicating time, a dial 2 having a circular shape; an hour hand 21; a minute hand 22; a seconds hand 23; a date indicator 24; a power reserve hand 25; a movement 10; a case 3 that stores the movement 10 therein; a wearing band 4; a crown 5 for performing time setting and the like; a rotating bezel pressing ring 6 attached to the case 3; and a rotating bezel 7 having a ring shape and rotatably provided on the case 3.

As shown in FIG. 2, the case 3 includes a case band 31, a case back 32, and a cover glass 33. The case band 31 is formed in a substantially cylindrical shape, and a holding portion 310 having a cylindrical shape is formed at an upper end portion (timepiece front surface side) of the case band 31. The cover glass 33 is attached to an inner peripheral surface of the holding portion 310 via a packing 34 having a ring shape. As shown in FIG. 4, a male screw portion 311 into which the rotating bezel pressing ring 6 to be described later is screwed is formed on an outer peripheral surface of the holding portion 310. In addition, the case band 31 includes an upper surface 314 formed on an outer peripheral side of the holding portion 310 and facing a back surface of the rotating bezel 7 to be described later.

As shown in FIG. 2, a female screw portion 312 is formed at a lower end portion (timepiece back surface side) of an inner peripheral surface of the case band 31, and a male screw portion 321 formed in the case back 32 is screwed into the female screw portion 312. For this reason, the case back 32 is detachably attached to the case band 31. In addition, a packing 35 having a ring shape is disposed between the case band 31 and the case back 32.

The dial 2, the hour hand 21, the minute hand 22, the seconds hand 23, the date indicator 24, the power reserve hand 25, and the movement 10 are stored in the case 3. The movement 10 of the present embodiment includes a mainspring that indicates a duration using the power reserve hand 25. Namely, the movement 10 is a movement of an electronically controlled mechanical timepiece including a train wheel, a mainspring, a speed governor and generator, and the like, or a movement of a mechanical timepiece including a train wheel, a mainspring, an escapement, and the like. The movement 10 may be a movement for an electronic timepiece including a train wheel, a step motor, a battery, and the like.

Rotating Bezel Pressing Ring

As also shown in FIG. 4, the rotating bezel pressing ring 6 includes a ring body 60 formed in an annular shape; a spanner groove 61 formed on an upper surface of the ring body 60; a female screw portion 62 formed on an inner peripheral surface of the ring body 60; and a protruding portion 63 formed to protrude from an outer peripheral surface of the ring body 60 toward the outer peripheral side.

The spanner grooves 61 are formed at six locations on the upper surface of the ring body 60 at intervals of 60°. Accordingly, the rotating bezel pressing ring 6 can be attached to and detached from the case band 31 by using a screw back opener used when a screw type case back is attached and detached and rotating the screw type back opener in a state where two or three pawls are engaged with the spanner grooves 61. The spanner grooves 61 are not limited to being formed at six locations, but may be formed, for example, at two or more locations. In addition, the spanner grooves 61 are not limited to being provided as a structure for rotating the rotating bezel pressing ring 6. For example, a jig that fits to a restricted portion 64A to be described later may be created, and the rotating bezel pressing ring 6 may be rotated by engaging the jig with the restricted portion 64A.

The female screw portion 62 is formed on the inner peripheral surface of the ring body 60 so as to be screwed to the male screw portion 311 of the holding portion 310.

As shown in FIG. 2, a height dimension of the protruding portion 63, namely, a dimension in a thickness direction of the timepiece 1 is smaller than a height dimension of the ring body 60, and the protruding portion 63 is formed at an intermediate portion of the ring body 60 in the thickness direction of the timepiece 1. A lower surface of the protruding portion 63 is formed above a lower surface of the ring body 60, namely, on the timepiece front surface side. Accordingly, when the rotating bezel pressing ring 6 is screwed and attached to the holding portion 310, a recessed groove having a predetermined height dimension is defined between an upper surface 314 of the case band 31 and the protruding portion 63. The rotating bezel 7 is disposed in the recessed groove between the upper surface 314 of the case band 31 and the protruding portion 63, and is held to be rotatable without falling off from the case band 31 or the rotating bezel pressing ring 6.

A lower surface of the protruding portion 63 is formed below the upper surface of the ring body 60, namely, on the timepiece back surface side. Accordingly, the upper surface of the protruding portion 63 is disposed below bottom surfaces of the spanner grooves 61, and is configured such that the protruding portion 63 is not affected when the upper surface of the ring body 60 is cut and the spanner grooves 61 are machined.

As shown in FIGS. 3 and 4, an annular restriction portion 64 is formed on an outer peripheral surface of the protruding portion 63 along a circumferential direction. In the annular restriction portion 64, a plurality of the restricted portions 64A are formed continuously in the circumferential direction. In the present embodiment, 60 restricted portions 64A are formed in the circumferential direction of the rotating bezel pressing ring 6. For this reason, the restricted portions 64A are formed at a central angle pitch of 6° in the circumferential direction of the rotating bezel pressing ring 6.

Figure 5:
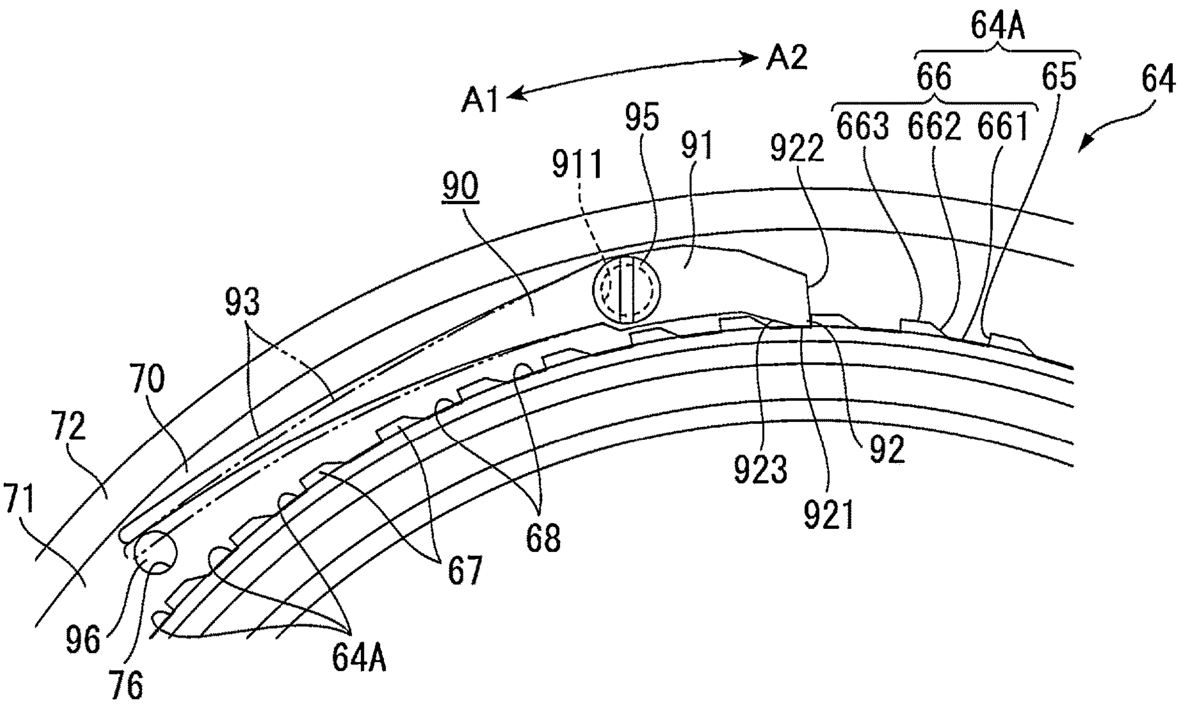
FIG. 5 is an enlarged view showing main portions of the timepiece according to the first embodiment.

As shown in the enlarged view of FIG. 5, each of the restricted portions 64A has a restriction surface 65 and a guide surface 66. The restriction surfaces 65 are surfaces formed along a diameter direction of the ring body 60, and are provided at a central angle pitch of 6°. In FIG. 5, when the timepiece 1 is viewed from the front surface side, A1 is a direction opposite to a hand movement direction of the hands such as the minute hand 22, namely, a counterclockwise direction, and A2 is a clockwise direction. In addition, the counterclockwise direction A1 is a first direction, and the clockwise direction A2 is a second direction.

The guide surface 66 includes an inner peripheral surface 661 that is continuous with an inner peripheral-side edge of the restriction surface 65; an inclined surface 662 that is continuous in an oblique direction from an end portion of the inner peripheral surface 661 in the counterclockwise direction A1 toward an outer periphery counterclockwise; and an outer peripheral surface 663 that is continuous with an outer peripheral end of the inclined surface 662 in the counterclockwise direction A1. An edge of the outer peripheral surface 663 on the counterclockwise direction A1 is continuous with an outer peripheral-side edge of the next restriction surface 65.

Accordingly, each of the restricted portions 64A includes a tooth portion 67 defined by the restriction surface 65, the outer peripheral surface 663, and the inclined surface 662, and protruding toward the outer peripheral side, and a groove portion 68 defined by the restriction surface 65, the inner peripheral surface 661, and the inclined surface 662, and recessed toward an inner peripheral side.

Rotating Bezel

As shown in FIGS. 1 to 4, the rotating bezel 7 is disposed around the holding portion 310 of the case band 31 and the cover glass 33, and is provided to be rotatable with respect to the case band 31.

The rotating bezel 7 includes a bezel body 70 formed in an annular shape (ring shape); an indicator plate 80 formed in an annular shape; and a click spring 90 that is a restricting member.

Bezel Body

The bezel body 70 is a substantially annular member made of a metal material, and as shown in FIG. 2 or 4, includes a base portion 71 facing the upper surface 314 of the case band 31, and an outer peripheral portion 72 formed to rise from the outer peripheral side of the base portion 71. An operating portion 73 having protrusions and recesses arranged in the circumferential direction is formed on an outer peripheral surface of the outer peripheral portion 72.

The base portion 71 is disposed along the upper surface 314 of the case band 31, and an inner peripheral end portion of the base portion 71 is disposed between the protruding portion 63 of the rotating bezel pressing ring 6 and the upper surface 314. In this case, a thickness dimension of the base portion 71 is smaller than a height dimension from the lower surface of the ring body 60 to the lower surface of the protruding portion 63 of the rotating bezel pressing ring 6.

For this reason, after the bezel body 70 is disposed on the outer peripheral side of the holding portion 310, when the rotating bezel pressing ring 6 is screwed into the holding portion 310, the bezel body 70 is restricted from moving upward, namely, toward the timepiece front surface side by the protruding portion 63, and is provided to be rotatable with respect to the case band 31 or the rotating bezel pressing ring 6.

As shown in FIG. 4, a screw hole 75 into which a screw 95 for rotatably attaching the click spring 90 and a mounting hole 76 for mounting a pin 96 that comes into contact with the click spring 90 are formed in the base portion 71. The screw hole 75 is formed to penetrate through the base portion 71 in the thickness direction of the timepiece, is formed at one location in the circumferential direction of the base portion 71, and in the present embodiment, as shown in FIG. 3, is formed on a substantially 12 o'clock position side.

The mounting hole 76 is formed to penetrate through the base portion 71 in the thickness direction of the timepiece, and is formed at a position separated from the screw hole 75 by a predetermined dimension, in the present embodiment, on a substantially 10 o'clock position side.

The formation positions of the screw hole 75 and the mounting hole 76 are not limited to the example of the present embodiment, and can be freely set to any positions on the circumference of the base portion 71.

As shown in FIG. 2, an upper portion side of the outer peripheral portion 72 slightly protrudes toward the inner peripheral side, and the indicator plate 80 is press-fitted and fixed to an inner peripheral surface of the protruding portion with a packing 77 having a ring shape interposed therebetween.

A packing 78 is also disposed between the bezel body 70 and the case band 31. By providing the packing 78, the slidability of the rotating bezel 7 can be improved, and the rotational operation of the rotating bezel 7 can be smoothly performed. Further, since the base portion 71 of the bezel body 70 is pushed upward by the packing 78 to come into contact with the lower surface of the protruding portion 63, the bezel body 70 is stably rotated without rattling when operated by a user. In addition, in a state where the user does not operate the bezel body 70, the bezel body 70 is held in the circumferential direction since the click spring 90 engages with the rotating bezel pressing ring 6, and is also held in the thickness direction of the timepiece since the base portion 71 is brought into contact with the protruding portion 63 by the packing 78.

Instead of the packing 78, a sheet material may be disposed to improve slidability. In addition, when the slidability of the rotating bezel 7 can be improved or rattling can be prevented by improving the machining precision of each component or performing a surface treatment such as ion plating, a configuration in which a component such as the packing 78 is not provided between the bezel body 70 and the case band 31 may be adopted.

Indicator Plate

As shown in FIG. 2, the indicator plate 80 includes an indicator portion 81 having an annular shape, and a press-fit portion 82 protruding from a lower surface of the indicator portion 81 and press-fitted to the inner peripheral side of the outer peripheral portion 72 with the packing 77 interposed therebetween.

As shown in FIGS. 1 and 4, a start mark 811 and a minute scale 812 indicated by the minute hand 22 are marked on a front surface of the indicator portion 81. The timepiece 1 of the present embodiment is a diver's watch, and by aligning the start mark 811 of the indicator portion 81 with the indication position of the minute hand 22 at the start of diving, an elapsed time from the start of diving can be checked using the minute scale 812 indicated by the minute hand 22.

A lower surface of the press-fit portion 82 is disposed spaced above the base portion 71, and the click spring 90 is disposed in a space between the base portion 71 and the press-fit portion 82.

Click Spring

As shown in FIGS. 4 and 5, the click spring 90 is composed of an elongated plate member, and includes a base portion 91; an engaging portion 92 that is formed at one end of the base portion 91, and that can engage with the restricted portion 64A of the rotating bezel pressing ring 6; and a biasing portion 93 which extends from the base portion 91 toward a side substantially opposite to the engaging portion 92, and of which the tip comes into contact with the pin 96.

A hole 911 through which the screw 95 is inserted is formed in the base portion 91. The screw 95 is a stepped screw including a screw portion that is screwed into the screw hole 75 of the base portion 71, and a shaft portion that is disposed in the hole 911. For this reason, the base portion 91, namely, the click spring 90 is rotatably attached to the base portion 71 by the screw 95. Therefore, a first shaft that rotatably attaches the click spring 90, which is a restricting member, to the base portion 71 is composed of the screw 95. The first shaft is not limited to the screw 95, and may be a member such as a fixing pin or a rivet as long as the member can rotatably attach the click spring 90 to the base portion 71.

In addition, the base portion 91 has a larger width dimension than the biasing portion 93, and has such a strength as not to be deformed even in a state where the engaging portion 92 formed at the tip of the base portion 91 is engaged with the restricted portion 64A. A first contact surface 921 that comes into contact with the inner peripheral surface 661 of the restricted portion 64A, a second contact surface 922 that comes into contact with the restriction surface 65 of the restricted portion 64A, and a third contact surface 923 that is provided continuously from the first contact surface 921 are formed on a tip side of the base portion 91.

The engaging portion 92 formed at the tip of the base portion 91 is composed of a corner portion defined by the first contact surface 921 and the second contact surface 922. An intersection angle between the first contact surface 921 and the second contact surface 922 is an acute angle less than 90°, for example, 82°. In addition, an intersection angle between the first contact surface 921 and the third contact surface 923 is an obtuse angle, for example, 168°.

The biasing portion 93 is provided on a side opposite to the engaging portion 92 with the screw 95, which is the first shaft, interposed therebetween, and is configured such that the width dimension decreases as the biasing portion 93 extends away from the base portion 91, and a tip of the biasing portion 93 comes into contact with a side surface of the pin 96. In a state where the engaging portion 92 of the click spring 90 comes into contact with a corner portion where the inner peripheral surface 661 and the restriction surface 65 intersect each other, and the pin 96 is not provided, as shown by a two-dot chain line in FIG. 5, a tip of the biasing portion 93 is configured to overlap the mounting hole 76, in a plan view, into which the pin 96 is press-fitted. For this reason, a second shaft which is fixed to the base portion 71 and with which the biasing portion 93 comes into contact is composed of the pin 96. The second shaft is not limited to the pin 96, and may be a stepped screw or the like, or may be a projection formed integrally with the base portion 71.

As shown by a solid line in FIG. 5, in a state where the pin 96 is mounted in the mounting hole 76 and the tip of the biasing portion 93 is brought into contact with the outer peripheral side of the pin 96, the biasing portion 93 is elastically deformed and slightly curved. Due to an elastic force generated by the deformation of the biasing portion 93, the engaging portion 92 is biased toward an inner peripheral surface 661 side to come into pressure contact with the corner portion between the restriction surface 65 and the inner peripheral surface 661, and the rotating bezel 7 is restricted from rotating in the clockwise direction A2, namely, the second direction with respect to the rotating bezel pressing ring 6.

The material of each component can be selected as appropriate, and in the present embodiment, the case band 31 and the case back 32 of the case 3, the bezel body 70 of the rotating bezel 7, and the rotating bezel pressing ring 6 are made of titanium, and the click spring 90 that is a restricting member is made of stainless steel; however, all the components may be made of stainless steel. If the rotating bezel pressing ring 6 is made of titanium and the click spring 90 is made of stainless steel, durability can be improved compared to a case where both are made of titanium. Further, the rotating bezel pressing ring 6 may be plated by ion plating or the like. By performing plating, slidability can be improved, friction when the click spring 90 moves while being in contact with the guide surface 66 can be reduced, and the rotating bezel 7 can be rotationally operated smoothly.

Next, an operation of the click spring 90 when the rotating bezel 7 is rotated in the counterclockwise direction A1 that is the first direction will be described with reference to FIGS. 6A to 6C.

Figure 6A:
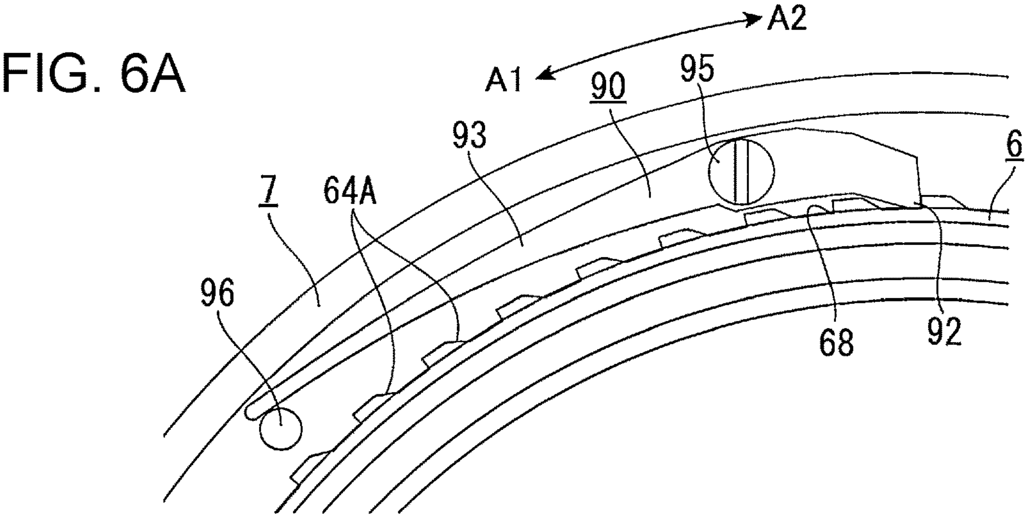
FIG. 6A is a view showing the operation of a rotating bezel according to the first embodiment when rotated.
Figure 6B:
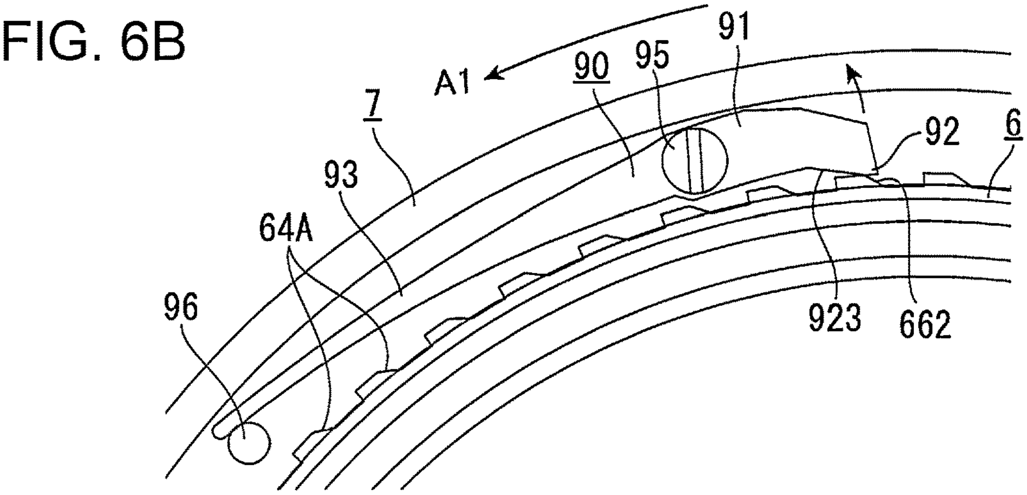
FIG. 6B is a view showing the operation of the rotating bezel according to the first embodiment when rotated.

As shown in FIG. 6A, when the engaging portion 92 is disposed in the groove portion 68, the tip of the biasing portion 93 comes into contact with the pin 96, so that the engaging portion 92 is biased toward the inner peripheral side of the rotating bezel pressing ring 6, namely, the inner peripheral surface 661 side. Furthermore, since the intersection angle between the first contact surface 921 and the second contact surface 922 of the engaging portion 92 is an acute angle, the tip of the engaging portion 92 comes into pressure contact with the corner portion where the inner peripheral surface 661 and the restriction surface 65 of the groove portion 68 intersect with each other so as to bite into the corner portion, and the rotating bezel 7 can be reliably restricted from rotating in the clockwise direction A2. Further, since the third contact surface 923 continuous with the first contact surface 921 is provided and the third contact surface 923 is configured not to come into contact with the inclined surface 662 in a state where the engaging portion 92 is engaged with the groove portion 68, the first contact surface 921 of the engaging portion 92 can also be prevented from being separated from the inner peripheral surface 661, and the rotation restriction state of the rotating bezel 7 by the engaging portion 92 can be reliably maintained.

Next, when the user or the like of the timepiece 1 grips the operating portion 73 and rotates the rotating bezel 7 in the counterclockwise direction A1, the click spring 90 also moves in the counterclockwise direction A1 with respect to the rotating bezel pressing ring 6, and the third contact surface 923 comes into contact with an outer peripheral edge of the inclined surface 662. Accordingly, as shown in FIG. 6B, the engaging portion 92 of the click spring 90 moves in a direction away from the rotating bezel pressing ring 6, namely, toward the outer peripheral side, and the base portion 91 in which the engaging portion 92 is formed also rotates toward the outer peripheral side with the screw 95 as a rotation axis. At this time, the amount of bending of the biasing portion 93 in contact with the pin 96 is increased, and a biasing force with which the engaging portion 92 comes into contact with the rotating bezel pressing ring 6 is also increased due to a force trying to recover the bending, namely, the elastic force.

As the rotating bezel 7 rotates in the counterclockwise direction A1, the third contact surface 923 and the first contact surface 921 come into contact with the inclined surface 662 of the restricted portion 64A, and the first contact surface 921 further comes into contact with the outer peripheral surface 663 of the restricted portion 64A. Accordingly, the engaging portion 92 of the click spring 90 comes off from the groove portion 68.

Figure 6C:
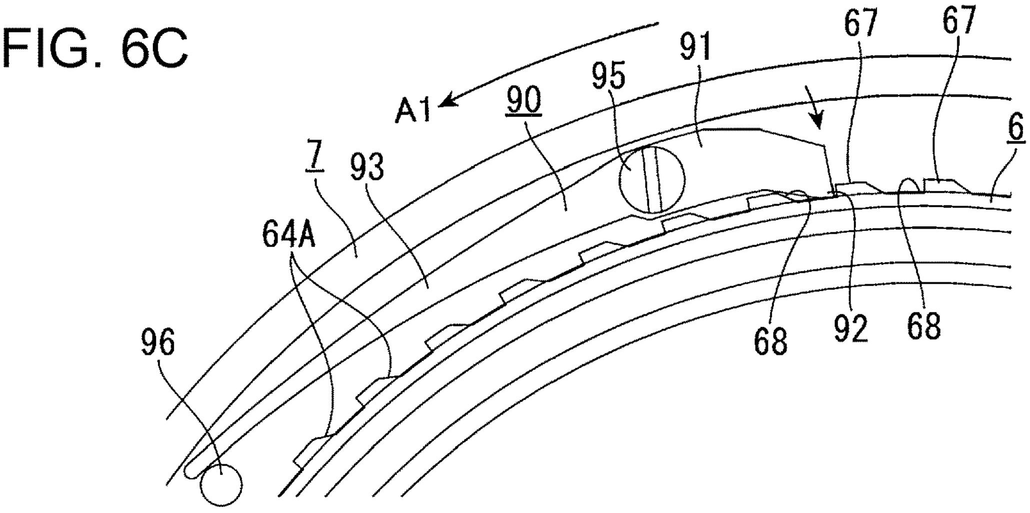
FIG. 6C is a view showing the operation of the rotating bezel according to the first embodiment when rotated.

Further, when the rotating bezel 7 is rotated in the counterclockwise direction A1, as shown in FIG. 6C, the engaging portion 92 of the click spring 90 engages with the next groove portion 68. At this time, since the engaging portion 92 comes off from the outer peripheral surface 663 and comes into contact with the inner peripheral surface 661 in a state where the biasing force generated by the bending of the biasing portion 93 is applied, a click sound is generated. In addition, since the engaging portion 92 comes into contact with the restriction surface 65, the rotation of the rotating bezel 7 in the clockwise direction A2 is restricted.

For this reason, when the rotating bezel 7 is rotated in the counterclockwise direction A1, every time the click spring 90 moves from the groove portion 68 over the tooth portion 67, and engages with the next groove portion 68, the rotation of the rotating bezel 7 in the clockwise direction A2 is restricted while a click sound is generated. In addition, since the click spring 90 moves in the counterclockwise direction A1 together with the rotating bezel 7, the location where a click sound is generated also sequentially moves around the dial 2 in the counterclockwise direction A1.

With the above-described configuration, in the rotating bezel 7, the user can integrally rotate the rotating bezel 7 including the indicator plate 80 in the counterclockwise direction by gripping and rotating the operating portion 73.

When the rotating bezel 7 is rotated with respect to the case 3, the biasing portion 93 of the click spring 90 is elastically deformed, and the engaging portion 92 disengages from the groove portion 68 of the restricted portion 64A with which the engaging portion 92 is engaged, and engages with the groove portion 68 of the next restricted portion 64A. Accordingly, a click feeling when operated can be obtained as the rotating bezel 7 is rotated, and the click spring 90 sequentially engages with the 60 restricted portions 64A, so that the rotating bezel 7 can be held at the position every time the rotating bezel 7 is rotated by 6°.

According to the timepiece 1 of the first embodiment, the following effects are obtained.

Since the base portion 71 of the bezel body 70 is held between the protruding portion 63 of the rotating bezel pressing ring 6 and the upper surface 314 of the case band 31, the holding structure for the rotating bezel 7 can be simplified, and the cost can be reduced.

Since the click spring 90 that engages with the restricted portion 64A of the annular restriction portion 64 is provided on the outer peripheral side of the annular restriction portion 64, the annular restriction portion 64 and the click spring 90 can be disposed in a radial direction of the timepiece 1, and the thickness dimension of the timepiece 1 can be reduced, thereby making the timepiece 1 thinner.

Since the protruding portion 63 of the rotating bezel pressing ring 6 has both the function of holding the rotating bezel 7 and the function of restricting the rotation of the rotating bezel 7 using the restricted portions 64A, the structure of the rotating bezel pressing ring 6 can be simplified. In addition, since the restricted portions 64A are formed in the protruding portion 63, the restricted portions 64A can be easily formed by press working or the like, and the machining cost can also be reduced.

Since there is no need to dispose the rotating bezel pressing ring 6 or the click spring 90 inside the case band 31, a storage space for the movement 10 is not affected, and various movements 10 can be used.

By engaging the click spring 90 with the restricted portion 64A, the rotating bezel 7 can be rotated only in the counterclockwise direction A1, and the position of the rotating bezel 7 in the rotation direction can be held every 6°. For this reason, the timepiece 1 of the present disclosure can be applied to a diver's watch in which in order to correctly identify an elapsed dive time, it is desirable to rotate the rotating bezel 7 only in the counterclockwise direction A1.

Since the restricting member is composed of the click spring 90 that is an elongated lever-shaped component, the click spring 90 can be used in common even with timepieces having different planar sizes.

In addition, the biasing portion 93 of the click spring 90 is formed in an elongated plate shape, and is deformed by being brought into contact with the pin 96, so that the biasing force with which the engaging portion 92 engages with the restricted portion 64A can be set to be constant.

Further, since the click spring 90 engages with the restricted portion 64A in the radial direction of the timepiece 1, variations in click force and click sound when the rotating bezel 7 is rotationally operated can be reduced. Namely, when the rotating bezel 7 is operated, since the user grips the rotating bezel 7 from above and operates the rotating bezel 7, a force that presses the rotating bezel 7 downward acts. The pressing force varies in the circumferential direction of the rotating bezel 7 due to the way in which the user holds the rotating bezel 7 or the bias of the force when applied. For this reason, when a structure in which the rotation of the timepiece 1 in an up-down direction is restricted is adopted as in JP-A-2015-108512, since the pressing force varies in the circumferential direction, the magnitude of the click force or click sound also varies.

Meanwhile, as in the present embodiment, when the restricted portions 64A of the rotating bezel pressing ring 6 and the click spring 90 are disposed in the radial direction of the timepiece 1 to perform restriction, since such a configuration is basically not affected by a variation in the pressing force applied from above, a variation in the magnitude of the click force or click sound can be suppressed, and the magnitude of the click force or click sound can be stabilized.

The protruding portion 63 of the rotating bezel pressing ring 6 is provided with the tooth portions 67, each of which is defined by the inclined surface 662, the outer peripheral surface 663, and the restriction surface 65. Since the tooth portion 67 can increase the area of the tooth portion 67 compared to a structure in which the inclined surface 662 is directly connected to the restriction surface 65 as in a sawtooth used in a ratchet mechanism, the rotating bezel 7 can be more reliably restricted from moving toward the timepiece front surface side, and the rotating bezel 7 can be reliably held by the protruding portion 63 and the case band 31.

Since the indicator plate 80 is detachably attached to the bezel body 70 and can hide the rotating bezel pressing ring 6 or the click spring 90, the design of the timepiece 1 can be improved. In addition, since the rotating bezel pressing ring 6 can be exposed and attached and detached by detaching the indicator plate 80 from the bezel body 70, maintenance work can also be easily performed.

Further, since the rotating bezel pressing ring 6 is screwed to the case band 31 in a screwing manner, the rotating bezel pressing ring 6 can be easily attached and detached in this respect as well. Particularly, since the spanner grooves 61 are formed in the rotating bezel pressing ring 6, the rotating bezel pressing ring 6 can be easily attached to and detached from the case band 31 by using a jig used when a screw type of the case back 32 is attached and detached.

Second Embodiment

Figure 7:
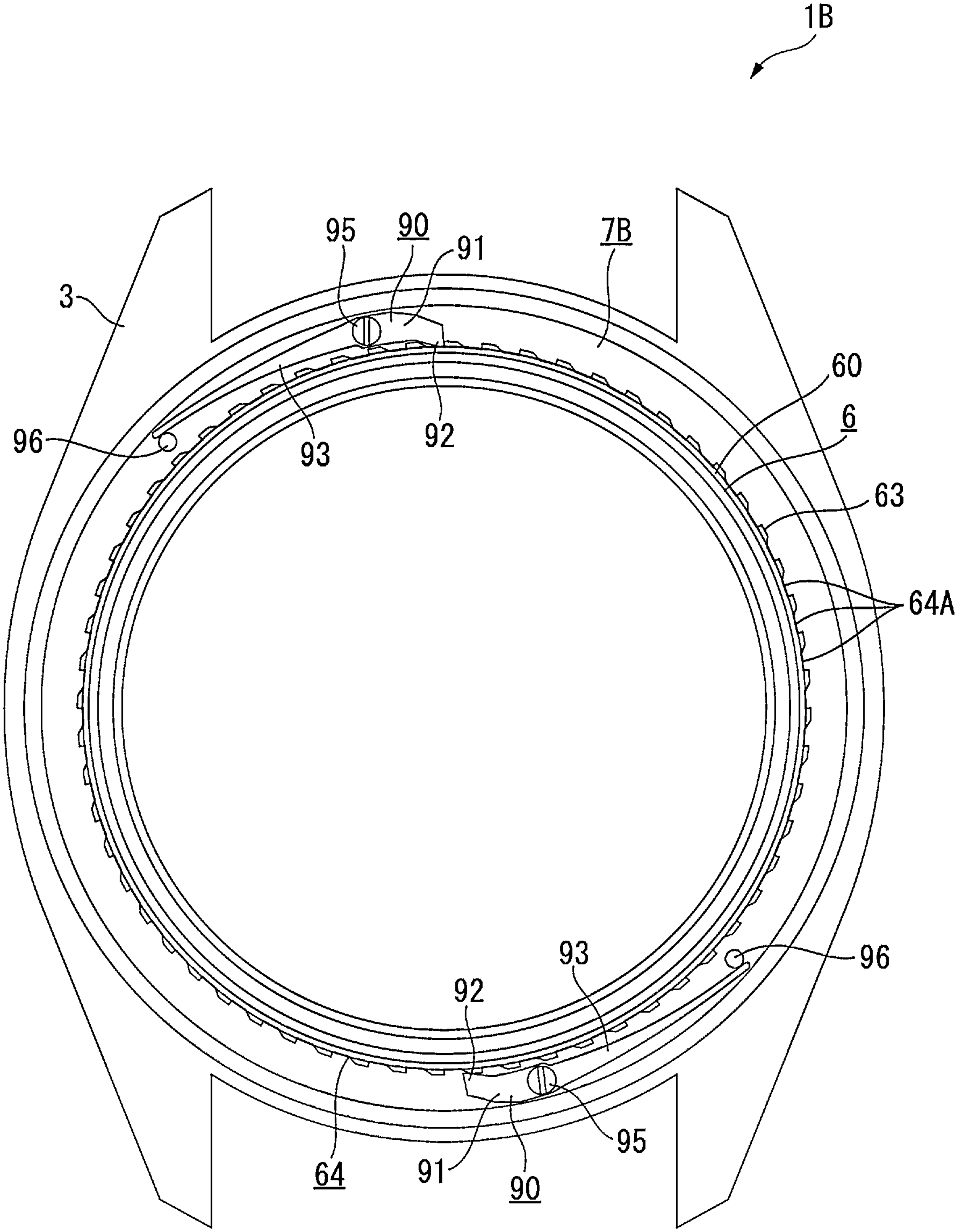
FIG. 7 is a plan view showing main portions of a timepiece according to a second embodiment.

Next, a timepiece 1B of a second embodiment will be described with reference to FIG. 7. The timepiece 1B is different from the timepiece 1 of the first embodiment in that a rotating bezel 7B provided with two click springs 90 serving as restricting members are used. For this reason, the same configurations as those of the timepiece 1 of the first embodiment are denoted by the same reference signs, and the description thereof will be omitted.

The two click springs 90 are disposed with a shift of 3° in phase where the two click springs 90 engage with the restricted portions 64A. In the present embodiment, 60 restricted portions 64A of the rotating bezel pressing ring 6 are provided, and the two click springs 90 that are restricting members are provided. When the number of the restricted portions 64A is n and the number of the click springs 90 that engage with the restricted portions 64A at different phases is m, in the timepiece 1B, any one of the click springs 90 engages with the restricted portion 64A every time the rotating bezel rotates by $360°/(n\times m)=360°/(60\times 2)=3°$. For this reason, the number of clicks when the rotating bezel 7 is rotated once (rotated by 360°) is $m\times n=120$ clicks.

According to the timepiece 1B, it is possible to achieve the same effects as those of the timepiece 1 of the first embodiment. In addition, since a plurality of the click springs 90 are provided and the phases where the click springs 90 engage with the restricted portions 64A are shifted from each other, the number of clicks can be increased without increasing the number of the restricted portions 64A. For this reason, the rotating bezel 7 can be more finely positioned, and convenience can be improved. For example, in the timepiece 1 of the first embodiment, since the number of the click springs 90 is one and the number of the restricted portions 64A is 60, the rotating bezel 7 is positioned every 6°, and the number of clicks is 60. Meanwhile, in the timepiece 1B of the present embodiment, since the two click springs 90 are disposed with shifted phases, the number of clicks of the rotating bezel 7 can be increased to 120, and the rotating bezel 7 can be positioned every 3°.

In addition, since there is no need to increase the number of the restricted portions 64A, the rotating bezel pressing ring 6 can be easily machined compared to, for example, when 120 restricted portions 64A are machined and formed.

Third Embodiment

Figure 8:
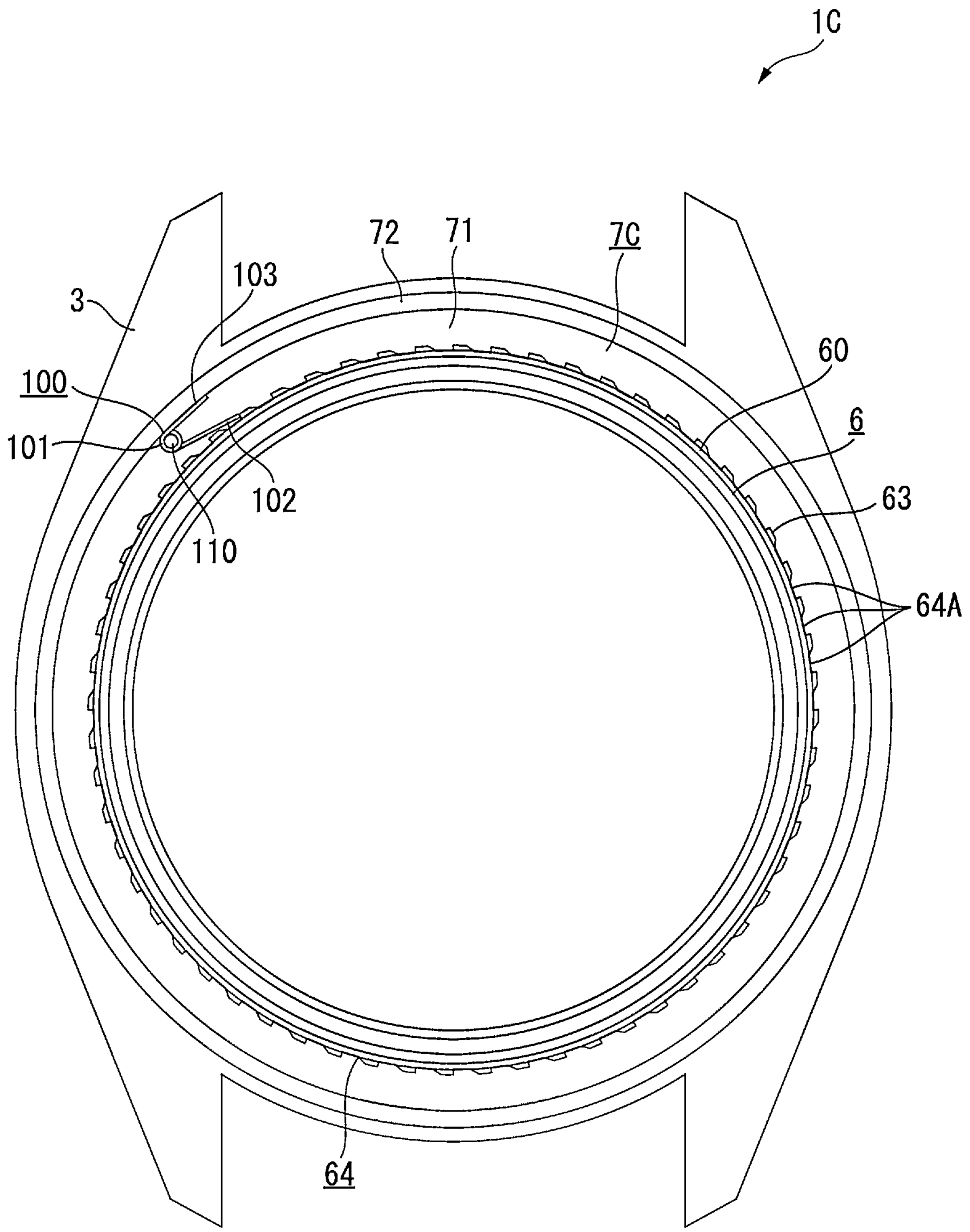
FIG. 8 is a plan view showing main portions of a timepiece according to a third embodiment.

Next, a timepiece 1C of a third embodiment will be described with reference to FIG. 8. The timepiece 1C is different from the timepiece 1 of the first embodiment in that a rotating bezel 7C provided with a torsion spring 100 serving as a restricting member is used. For this reason, the same configurations as those of the timepiece 1 of the first embodiment are denoted by the same reference signs, and the description thereof will be omitted.

The torsion spring 100 includes a coil portion 101, a first arm portion 102, and a second arm portion 103. The torsion spring 100 is rotatably attached to the rotating bezel 7C by inserting a pin 110 fixed to the base portion 71 of the rotating bezel 7C into the coil portion 101.

The first arm portion 102 of the torsion spring 100 engages with the restricted portion 64A of the rotating bezel pressing ring 6, and the second arm portion 103 comes into contact with an inner peripheral surface of the outer peripheral portion 72. Accordingly, the first arm portion 102 of the torsion spring 100 is engaged with the restricted portion 64A by a predetermined biasing force. For this reason, in the torsion spring 100, an engaging portion is composed of the first arm portion 102, and a biasing portion is composed of the second arm portion 103 and the coil portion 101.

According to the timepiece 1C, it is possible to achieve the same effects as those of the timepiece 1 of the first embodiment. In addition, since the torsion spring 100 is used as a restricting member, the cost can be further reduced.

Modification Examples

The number of the restricted portions 64A formed in the rotating bezel pressing ring 6 and the number of the click springs 90 that are restricting members are not limited to the example of each embodiment.

For example, when the number of the restricted portions 64A is n and the number of the click springs 90 that engage with the restricted portions 64A with phases shifted from each other is m, if n=60 and m=3, restriction can be performed every time the rotating bezel 7 is rotated by 2°, and the number of clicks can be set to 180. In addition, if n=30 and m=4, restriction can be performed every time the rotating bezel 7 is rotated by 3°, and the number of clicks can be set to 120 even when the number of the restricted portions 64A is reduced. Further, the number of the restricted portions 64A or the number of the click springs 90 of which the phases are shifted from each other when engaged, such as n=90 and m=2, or n=40 and m=3, may be set as appropriate.

In addition, when a plurality of the click springs 90 are provided, it is preferable that the click springs 90 are disposed at substantially equal intervals; however, the click springs 90 may be disposed at different intervals.

Further, when a plurality of click springs 90 are provided, the phases of engagement with the restricted portions 64A may be aligned. For example, three click springs 90 may be disposed at intervals of 120°, and may be configured to simultaneously engage with the restricted portions 64A. In this case, when the rotating bezel 7 is rotated, variations in click force in the circumferential direction can be reduced, and a constant click sound can be generated.

In addition, a plurality of sets of the click springs 90 that engage with the restricted portions 64A with phases shifted from each other may be provided. For example, when the click springs 90 are provided at four locations at intervals of substantially 90°, two click springs 90 disposed at an interval of 180° may be set to engage with the restricted portions 64A at the same phase, and two sets of the click springs 90 may be configured to engage with the restricted portions 64A at different phases. In this case, if m=2 and n=60, the number of clicks is also 120.

In the embodiments, the restricted portions 64A of the rotating bezel pressing ring 6 and the click spring 90 are configured such that the rotating bezel 7 is rotated only in the counterclockwise direction A1; however, by forming the restricted portions 64A as V grooves or U grooves, and configuring the engaging portion 92 of the click spring 90 so as to be engageable with the restricted portions 64A, the rotating bezel 7 may be configured to be rotatable in both the counterclockwise direction A1 and the clockwise direction A2.

The restricted portion may be configured such that the tooth portion has a substantially triangular shape in a plan view as in a sawtooth of a ratchet mechanism.

The structure for fixing the rotating bezel pressing ring 6 to the case band 31 is not limited to the structure in which the rotating bezel pressing ring 6 is screwed and fixed to the case band 31 in a screwing manner as in the embodiments, and may be any structure as long as the rotating bezel pressing ring 6 can be detachably fixed to the case band 31.

The timepiece of the disclosure is not limited to a diver's watch, and can be applied to a wristwatch including a rotating bezel. For example, in a timepiece having a so-called world time function, the names of representative cities in time zones of the world may be indicated around a dial such as a bezel, and the rotating bezel of the disclosure may be applied to the indication. In addition, a rotating bezel with a circular slide rule for aviation measurement may be applied to a chronograph timepiece. Further, a rotating bezel with a simple azimuth meter may be applied to an outdoor timepiece.

The rotating bezel may rotate only in the counterclockwise direction A1 as in the embodiments, may rotate only in the clockwise direction A2, or may rotate in both directions, and may be designed according to the use of the rotating bezel.

The disclosure is not limited to a wristwatch, and can be applied to various timepieces including a rotating bezel.

SUMMARY OF PRESENT DISCLOSURE

A timepiece according to an aspect of the present disclosure includes hands that indicate time; a movement that drives the hands; a case band that stores the movement; a rotating bezel provided to be rotatable with respect to the case band; and a rotating bezel pressing ring fixed to the case band. The rotating bezel pressing ring includes a protruding portion that protrudes outward in a radial direction, and that holds the rotating bezel between the protruding portion and the case band. The protruding portion is provided with an annular restriction portion in which a plurality of restricted portions are continuous with each other in a circumferential direction. The rotating bezel is provided with a restricting member that engages with the restricted portion. When the rotating bezel is rotated, the restricting member sequentially engages with the restricted portions, so that a click feeling is generated in the rotational operation of the rotating bezel, and a position of the rotating bezel is restricted.

According to the timepiece of the present disclosure, since the rotating bezel pressing ring is attached to the case band, and the rotating bezel is held between the protruding portion of the rotating bezel pressing ring, which protrudes outward in the radial direction, and the case band, the holding structure for the rotating bezel can be simplified, maintainability can also be improved, and the cost can also be reduced.

Since the protruding portion of the rotating bezel pressing ring is provided with the annular restriction portion composed of the plurality of restricted portions that are continuous with each other in the circumferential direction, and the rotating bezel is provided with the restricting member that engages with the restricted portion, the annular restriction portion and the restricting member can be disposed in the radial direction. For this reason, the thickness dimension of the timepiece can be reduced, and the timepiece can be made thinner. In addition, since there is no need to dispose the rotating bezel pressing ring or the restricting member inside the case band, a storage space for the movement is not affected, and various movements can be used.

Further, since the restricted portions are formed in the protruding portion of the rotating bezel pressing ring, the protruding portion can have both the function of holding the rotating bezel and the function of restricting the rotation of the rotating bezel, and can be easily formed by press working or the like, and the machining cost can also be reduced.

Holding the rotating bezel between the protruding portion of the rotating bezel pressing ring and the case band includes not only a structure in which the rotating bezel is directly interposed between the protruding portion and the case band, but also a structure in which the rotating bezel is interposed with another material such as a sheet intervening therebetween.

In the timepiece of the present disclosure, it is preferable that in a state where the restricting member is not engaged with the restricted portion, the rotating bezel is rotatable in a first direction that is one of a clockwise direction and a counterclockwise direction, and a second direction that is the other of the clockwise direction and the counterclockwise direction, it is preferable that the restricting member includes an engaging portion that engages with the restricted portion, and a biasing portion that biases the engaging portion toward the restricted portion, it is preferable that the restricted portion has a restriction surface that comes into the engaging portion to restrict a rotation of the rotating bezel in the second direction, and a guide surface provided continuously from an inner peripheral-side edge of the restriction surface to an outer peripheral-side edge of a next restriction surface in the first direction, and it is preferable that as the rotating bezel rotates in the first direction, the engaging portion is guided by the guide surface to move toward an outer peripheral side in the radial direction, and when the engaging portion comes off from the guide surface, the engaging portion is moved toward an inner peripheral side in the radial direction by the biasing portion to come into contact with the restriction surface and to restrict the rotation of the rotating bezel in the second direction.

According to the timepiece of the present disclosure, since the engaging portion of the restricting member can restrict the rotation of the rotating bezel in the second direction by coming into contact with the restriction surface of the restricted portion, the rotating bezel can be rotated only in the first direction, and the position of the rotating bezel can be restricted. For this reason, the timepiece of the present disclosure can be applied to a diver's watch in which in order to correctly identify an elapsed dive time, it is desirable to rotate the rotating bezel only in the one direction that is the counterclockwise direction.

In the timepiece of the present disclosure, it is preferable that the guide surface includes an inner peripheral surface continuous with the inner peripheral-side edge of the restriction surface, an inclined surface continuous in an oblique direction from an end portion of the inner peripheral surface in the first direction toward an outer periphery in the first direction, and an outer peripheral surface continuous from an outer peripheral end of the inclined surface in the first direction.

According to the timepiece of the present disclosure, since the protruding portion of the rotating bezel pressing ring is provided with a tooth portion protruding outward and defined by the inclined surface, the outer peripheral surface, and the restriction surface, and the tooth portion can be increased in area compared to a sawtooth, the rotating bezel can be reliably restricted from moving toward a timepiece front surface side, and the rotating bezel can be reliably held by the protruding portion and the case band.

In the timepiece of the present disclosure, it is preferable that a female screw portion is formed on an inner peripheral surface of the rotating bezel pressing ring, it is preferable that a male screw portion is formed on an outer peripheral surface of the case band, and it is preferable that the rotating bezel pressing ring is fixed to the case band by screwing the female screw portion to the male screw portion.

According to the timepiece of the present disclosure, since the rotating bezel pressing ring is attached to the case band by being screwed thereinto, the rotating bezel pressing ring can be easily attached to and detached from the case band. For this reason, even when the rotating bezel or the restricting member is damaged, these components can be easily replaced or repaired, and maintenance work such as cleaning of each component can also be easily performed.

In the timepiece of the present disclosure, it is preferable that the rotating bezel includes a bezel body and the restricting member, it is preferable that the bezel body includes a base portion disposed between the case band and the protruding portion, and it is preferable that the restricting member is an elongated lever-shaped component attached to the base portion, and an engaging portion that engages with the restricted portion is provided at one end portion of the restricting member.

According to the timepiece of the present disclosure, since the restricting member is composed of an elongated lever-shaped component that is attached to the base portion of the bezel body, the restricting member can be used in common even with timepieces having different planar sizes.

In the timepiece of the present disclosure, it is preferable that the restricting member is rotatably attached to the base portion by a first shaft, and it is preferable that a biasing portion that comes into contact with a second shaft fixed to the base portion is provided on a side opposite to the engaging portion with the first shaft interposed between the biasing portion and the engaging portion.

According to the timepiece of the present disclosure, the restricting member is rotatably attached to the base portion by the first shaft composed of a screw, a pin, or the like, the biasing portion is provided on the side opposite to the engaging portion with the first shaft interposed therebetween, and the biasing portion is in contact with the second shaft composed of a pin or the like fixed to the base portion. For this reason, by bringing the biasing portion into contact with the second shaft, the biasing portion can be deformed to generate an elastic force, and the elastic force is converted into a rotation torque about the first shaft, so that the biasing force that brings the engaging portion into contact with the restricted portion can be controlled. For this reason, the rotation of the rotating bezel can be appropriately restricted, and an appropriate click feeling can be obtained when the rotating bezel is rotated.

In the timepiece of the present disclosure, it is preferable that a packing is disposed between the case band and the rotating bezel.

According to the timepiece of the present disclosure, since the packing is disposed between the case band and the rotating bezel, slidability when the rotating bezel is rotated is enhanced, and rotational operability of the rotating bezel can be improved.

In the timepiece of the present disclosure, it is preferable that a plurality of the restricting members are provided, and it is preferable that when the number of the restricted portions is n and the number of the restricting members that engage with the restricted portions at different phases is m, any of the restricting members engages with the restricted portion every time the rotating bezel is rotated by 360°/(n× m).

According to the timepiece of the present disclosure, for example, when n=60 and m=2, the restricting members can be configured to engage with the restricted portions every time the rotating bezel is rotated by 360°/(60×2)=3°. For this reason, the number of clicks when the rotating bezel is rotated once (rotated by) 360° can be set to 120, and the number of clicks can be increased to a multiple of the number of the restricted portions.

In the timepiece of the present disclosure, it is preferable that the rotating bezel includes a bezel body and an indicator plate that is detachably attached to the bezel body, and it is preferable that the indicator plate is disposed on a timepiece front surface side of the rotating bezel pressing ring and the restricting member.

According to the timepiece of the present disclosure, since the indicator plate is disposed on the timepiece front surface side of the rotating bezel pressing ring and the restricting member, the rotating bezel pressing ring and the restricting member can be prevented from being exposed on a timepiece front surface, and the design of the timepiece can be improved. In addition, since the rotating bezel pressing ring can be exposed and attached and detached by detaching the indicator plate from the bezel body, maintenance work can also be easily performed.

What is claimed is:

1. A timepiece comprising: hands that indicate time;
a movement that drives the hands;
a case band that stores the movement;
a rotating bezel provided to be rotatable with respect to the case band; and
a rotating bezel pressing ring fixed to the case band,
wherein the rotating bezel pressing ring includes a protruding portion that protrudes outward in a radial direction, and that holds the rotating bezel between the protruding portion and the case band,
the protruding portion is provided with an annular restriction portion in which a plurality of restricted portions are continuous with each other in a circumferential direction,
the rotating bezel is provided with a restricting member that engages with the plurality of restricted portions,
when the rotating bezel is rotated, the restricting member sequentially engages with the plurality of restricted portions so that a click feeling is generated in a rotational operation of the rotating bezel, and a position of the rotating bezel is restricted,
the rotating bezel is further provided with a bezel body, and the bezel body includes a base portion disposed between the case band and the protruding portion,
the restricting member is an elongated lever-shaped component attached to the base portion, and an engaging portion that engages with the plurality of restricted portions is provided at one end portion of the restricting member,
the restricting member is rotatably attached to the base portion by a first shaft, and
the restricting member further includes a biasing portion, the biasing portion comes into contact with a second shaft fixed to the base portion, and the biasing portion is provided on a side opposite to the engaging portion with the first shaft interposed between the biasing portion and the engaging portion.

2. The timepiece according to claim 1, wherein
in a state where the restricting member is not engaged with the plurality of restricted portions, the rotating bezel is rotatable in a first direction that is one of a clockwise direction and a counterclockwise direction, and a second direction that is the other of the clockwise direction and the counterclockwise direction,
the biasing portion biases the engaging portion toward a corresponding portion of the plurality of restricted portions,
the corresponding portion of the plurality of restricted portions has a restriction surface that comes into the engaging portion to restrict a rotation of the rotating bezel in the second direction, and a guide surface provided continuously from an inner peripheral-side edge of the restriction surface to an outer peripheral-side edge of a next restriction surface in the first direction, and
as the rotating bezel rotates in the first direction, the engaging portion is guided by the guide surface to move toward an outer peripheral side in the radial direction, and when the engaging portion comes off from the guide surface, the engaging portion is moved toward an inner peripheral side in the radial direction by the biasing portion to come into contact with the restriction surface and to restrict the rotation of the rotating bezel in the second direction.

3. The timepiece according to claim 2, wherein
the guide surface includes an inner peripheral surface continuous with the inner peripheral-side edge of the restriction surface, an inclined surface continuous in an oblique direction from an end portion of the inner peripheral surface in the first direction toward an outer periphery in the first direction, and an outer peripheral surface continuous from an outer peripheral end of the inclined surface in the first direction.

4. The timepiece according to claim 1, wherein
a female screw portion is formed on an inner peripheral surface of the rotating bezel pressing ring,
a male screw portion is formed on an outer peripheral surface of the case band, and
the rotating bezel pressing ring is fixed to the case band by screwing the female screw portion to the male screw portion.

5. The timepiece according to claim 1, wherein
a packing is disposed between the case band and the rotating bezel.

6. The timepiece according to claim 1, wherein
a plurality of the restricting members are provided, and
when a number of the plurality of restricted portions is n and a number of the plurality of the restricting members that engage with the plurality of restricted portions at different phases is m,
any of the plurality of the restricting members engages with a corresponding portion of the plurality of restricted portions every time the rotating bezel is rotated by 360°/(n×m).

7. The timepiece according to claim 1, wherein the rotating bezel includes a bezel body and an indicator plate that is detachably attached to the bezel body, and the indicator plate is disposed on a timepiece front surface side of the rotating bezel pressing ring and the restricting member.

* * * * *